Oct. 4, 1932.    C. L. SNYDER    1,880,989
SHIPPING DECK
Filed Jan. 21, 1931
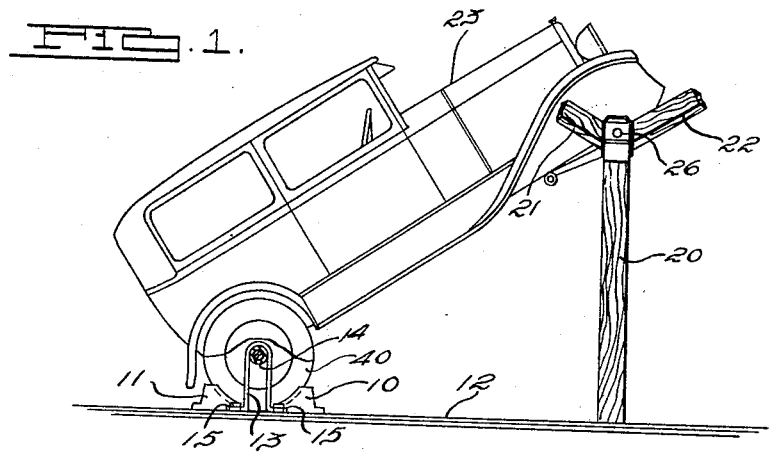
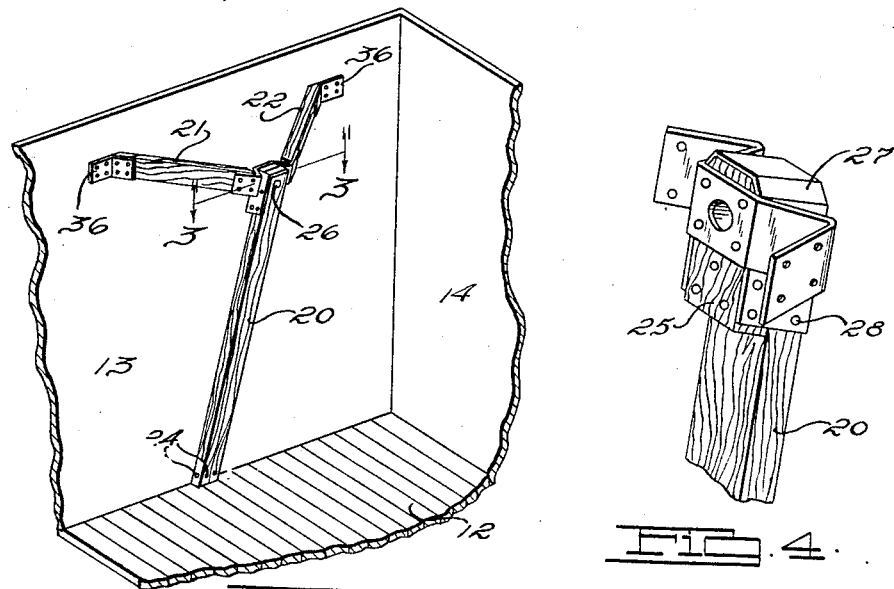
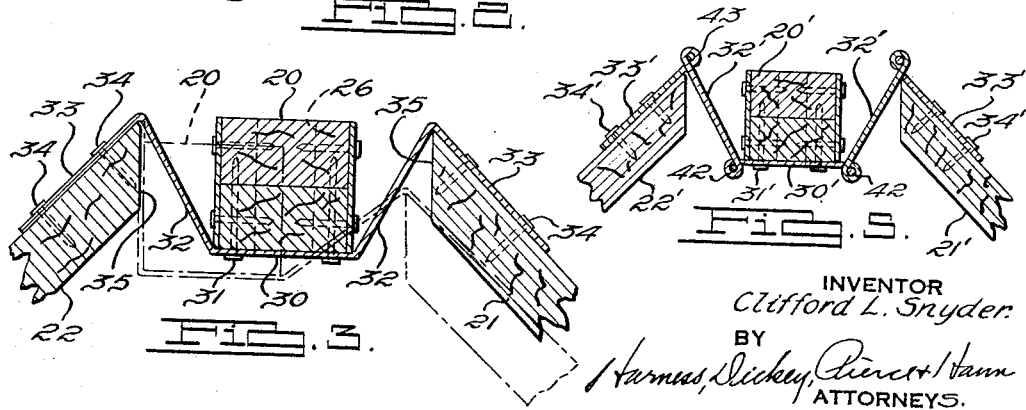
INVENTOR
Clifford L. Snyder.
BY
Harness, Dickey, Pierce & Haun
ATTORNEYS.

Patented Oct. 4, 1932

1,880,989

UNITED STATES PATENT OFFICE

CLIFFORD L. SNYDER, OF DETROIT, MICHIGAN, ASSIGNOR TO THE EVANS AUTO LOADING COMPANY, INC., A CORPORATION OF DELAWARE

SHIPPING DECK

Application filed January 21, 1931. Serial No. 510,124.

This invention relates to means for use in connection with the shipping of automobiles in freight cars, and particularly to a construction in which at least one end of the automobile is supported in elevated relation with respect to the floor of the freight car, the principal object being the provision of a device of this type that will be more efficient than the devices heretofore proposed, that will be less liable to damage the automobiles supported thereby in shipment, and that will be more economical to use.

Further objects are to provide a device of the type described which will be capable of yielding in the direction of the length of the freight car so as to provide a greater time element for the device to overcome the momentum of the automobile supported thereby when the freight car is subjected to a shock, such as are commonly experienced in switching operations; to provide a device of the type described including a vertically disposed supporting member and oppositely extending angular bracing members so secured to the supporting member that the upper end of the supporting member may have relative movement between the ends of the bracing members; and to provide a simple and economical structure whereby such effect may be obtained.

Further objects are to provide a means for supporting automobiles in shipment including means for supporting one end of the automobile at an elevation from the floor of the freight car so that such end is permitted a limited amount of relatively free movement longitudinally of the freight car, and to provide means fixed relative to the floor of the freight car and cooperating with the tires at the other end of the vehicle whereby the resiliency of the tires may be taken advantage of for the purpose of resiliently resisting longitudinal movement of the automobile.

The above being among the objects of the present invention the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Fig. 1 is a more or less diagrammatic side elevation of an automobile supported in accordance with the present invention, the supporting device for the near side of the front end of the automobile being partly broken away.

Fig. 2 is a fragmentary perspective view of a portion of a freight car showing one of the supporting devices illustrated in Fig. 1 in operative relationship with respect thereto.

Fig. 3 is an enlarged fragmentary sectional view taken as on line 3—3 of Fig. 2.

Fig. 4 is a fragmentary enlarged perspective view showing the upper end of the supporting member with the attaching bracket in position thereon.

Fig. 5 is a view similar to Fig. 3 showing a slightly modified form of the structure.

In order to economically ship automobiles in freight cars it has long been the practice to elevate either one or both ends of the automobiles so as to permit a greater number of automobiles to be shipped per freight car. Where the automobiles are of the so called open type, having collapsible tops, it is usually the practice to remove or lower the tops which then allows one automobile to be positioned directly above the other thereof in the freight car, but when automobiles of the so called closed type are shipped, then there is insufficient room to ship one automobile wholly above the other and consequently in such cases it is the usual practice to elevate the front end only of the automobile, which then allows the front end of one automobile to be suspended over the back end of another automobile, and this likewise permits a greater number of automobiles to be shipped per freight car than in cases where they are positioned horizontally therein.

In either case, at least one end of the automobile must be elevated from the floor, and a common form of means for supporting the elevated end of the automobile comprises a pair of devices, one on each side of the automobile, and each composed of a central vertically extending member the upper end of which is provided with means for engaging the corresponding end of the corresponding wheel axle, and the lower end of which is secured to the floor of the freight car immediately adjacent the corresponding side wall thereof. The upper end of such supporting member is maintained against movement longitudinally of the freight car by two brace members, one of which extends forwardly from the upper end of the supporting member and one of which extends rearwardly from the upper end of the supporting member, the other ends of these bracing members extending into contact with the corresponding side walls of the freight car and being secured thereto.

Where one end only of the automobile is elevated during shipment, the usual practice is to allow the tires at the opposite end of the automobile to rest directly upon the floor of the freight car, in which case a pair of so called chock blocks, such as are indicated at 10 and 11 in Fig. 1, are secured to the floor 12, of the freight car by any suitable means, one in advance of the corresponding wheel and one rearwardly of the corresponding wheel, each chock block being formed to embrace the corresponding surface of the tire and being secured in contact therewith. Suitable means are then provided for preventing the rear wheels from jumping out of the chock blocks 10 and 11, and while a number of different constructions for performing this duty are conventionally employed, the particular means shown in Fig. 1 comprises an inverted U-shaped strap member 13 which passes over the rear axle 14 of the automobile and has its lower ends outwardly bent as at 15 and suitably secured to the floor 12 of the freight car.

In the past the practice has been, in connection with the elevating and supporting means for the front end of the automobile, to rigidly secure the brace members to the upper end of the supporting member. I have found that with such a construction when the freight car is subjected to a shock such as occurs in switching operations, the momentum of the automobile which must be overcome under such shock, and which momentum must be resisted by the supporting and securing means above described, effects the front elevating and supporting means in the following manner. First, it tends to place the supporting member under torsion which not only has a tendency to split the supporting member lengthwise thereof but also has the tendency to twist the brace members loose from the supporting member. Second, it has the tendency to place one of the brace members under compression and the other brace member under tension and due to the rigid connection between the brace members and the supporting member has a tendency to tear the brace member under tension away from the upper end of the supporting member.

In the past, to overcome the difficulties above described, it has been the practice to construct such devices or decks of members of a size which would otherwise be wholly unwarranted, and accordingly such devices have been relatively expensive and impose a relatively great burden on those who must ultimately pay for the same. Furthermore, because of the construction of the conventional devices, where a shock of major proportion is experienced, it often happens that the axles of the automobile are bent, thus requiring replacement, and increasing the relative cost of shipment.

I have found that by suitably modifying the conventional construction as above described for elevating and supporting one end of an automobile, that the size of the members may be considerably reduced, thus effecting a marked economy in the cost of such devices, and furthermore permitting a greater time element for overcoming the momentum of the automobile when the freight car is subjected to a shock, thereby eliminating to a great extent the damage to the automobile axles heretofore prevalent.

In the main, the manner in which this is accomplished is to provide a connection between the ends of the brace members and the upper end of the supporting member such that the upper end of the supporting member is permitted a limited amount of relatively free movement longitudinally of the freight car between the ends of the brace members, and this in a manner to eliminate the tendency of the brace member under tension from tearing away from the supporting member, and furthermore relieving the torsional effect on the supporting member at such time.

Referring to the drawing a freight car is indicated having the floor 12, side wall 13 and end wall 14. In Fig. 1, the automobile is shown as being elevated at the front end only by a pair of devices each comprising the centrally located supporting member 20 and angularly disposed brace members 21 and 22. As previously described it will be understood that one of such devices is provided on either side of the freight car, each one engaging one of the ends of the front axle of the automobile which is indicated generally as at 23 in Fig. 1. As best illustrated in Fig. 2, it will be noted that the lower end of the supporting member 20 is secured to the floor 12 and against the side wall 13 by nails such as 24 or other suitable means. The upper end of the supporting member 20 is inclined inwardly from the side wall 13 so as to be capable of engaging the end of the front axle of the automobile which is, of course, of less width than the freight car. In the particular construction shown, the brace member 20 is illustrated as being formed from a two-by-four piece of timber, and as best illustrated in Figs. 3 and 4 a short strip 25 of two-by-four is nailed to the upper end of the member 20 to increase the thickness thereof at that point. It is to be understood that such additional piece 25 is not necessary in all cases, and to be further understood that the supporting member 20 may be constructed of any size of timber or other material that may be found desirable. The upper end of the member 20 is provided with an opening 26 therein for receiving the corresponding end of the front axle of the automobile 23, it being understood that the opening 26 extends at an angle to the length of the member 20 corresponding to the angle between the member 20 and the side walls 13 of the freight car so as to properly accommodate the end of the axle.

In order to strengthen and reinforce the upper end of the member 20, I prefer to extend a piece of sheet metal such as 27 up the side faces and over the top thereof, it being preferably secured in place by means of nails such as 28 or other suitable means. In order to attach the braces 21 and 22 to the upper end of the member 20 a bracket member which may be best described as being somewhat W in shape and comprising a flat central portion 30 which is secured to the rear face of the upper end of the member 20 by suitable means such as nails 31, intermediate portions 32 extending forwardly and rearwardly from the corresponding ends of the portion 30, and reversely bent terminal portions 33 which are secured to the corresponding ends of the braces 21 and 22 as by means of nails 34.

The drawing shows the device in its normal position in which it will be noted that the intermediate portions 32 extend angularly away from the side faces of the member 20, and the outer ends of the face members 21 and 22 are beveled off as at 35 so that the corresponding edges thereof are disposed at an angle to the corresponding portions 32. The opposite ends of the brace members 21 and 22 may be secured to the side 13 of the freight car by means of sheet metal bracket members such as 36, or any other suitable means.

With this construction, and as perhaps best understood from an inspection of Fig. 3, the upper end of the supporting member 20 is positioned between the adjacent ends of the braces 22 and 21 and normally in spaced relationship with respect to both of them, but it will be understood that outside of the cooperation between the chock blocks 10 and 11 with the rear tires, the only thing that maintains the upper end of the member 20 in spaced relationship to both of such members is the stiffness of the metal of the connecting bracket member, and such member is preferably made of relatively easily bendable material so that relatively small force will be required to move the upper end of the member 20 into contact with the end of either one of the brace members 21 and 22.

Considering now an automobile supported at its front end and anchored at its back end as indicated in Fig. 1 by devices such as indicated in the drawing, and the freight car is shunted into a freight car ahead of it. If the automobile is facing in the direction of movement of the freight car, its momentum will tend to carry it in the same direction of movement upon such shock. In such case the upper end of the supporting members 20 will be free to move forwardly into contact with the corresponding end of the brace members 22, and until such time substantially no compression will be exerted upon the members 22.

However, it will be apparent that such forward movement of the automobile is resisted by the front chock block 10 for each one of the rear wheels and this resistance will be exerted through the corresponding tire 40. The tires being inflated, as is the common practice, and being resilient will yield an amount commensurate with the force of the shock and unless the shock is great enough to compress the tires to such an extent as to permit the upper end of the members 20 to contact with the end of the brace members 22, no such contact will, in fact, occur, and all of the momentum of the automobile will be absorbed between the tires 40 and the chock blocks 10. As will be apparent, the tires 40 in thus yielding in absorbing the shock on the automobile due to overcoming the momentum of its movement, will distribute the force necessary to overcome such momentum through a relatively small yet material time element, which was never possible in conventional constructions due to the rigid connection between the members corresponding to the brace members 22 and the supporting members 20. In fact this time element herein provided for absorbing the shock is sufficient to permit a marked reduction in the size of the members employed in the devices for supporting the front end of the automobile, and, at the same time, the shock on the automobile itself is reduced to such an extent to substantially eliminate damage thereto during ordinary switching operations.

Should the shock be great enough to compress the tires 40 to such an extent as to permit the upper end of the supporting members 20 to contact with the corresponding ends of the brace members 22, then the brace members 22 will be called into play to aid the compression of the tires 40 in resisting and overcoming the momentum of the automobile. However, as will be apparent the momentum of the automobile by this time will have been considerably reduced and consequently the brace members need not be nearly as substantial as the brace members heretofore employed in conventional constructions. Furthermore, the upper end of the supporting members 20 moves into contact with the end of the cooperating brace members, the portions 32 of the bracket connecting the members 20 with the other of the brace members will bend to such an extent as to substantially eliminate the setting up of any tension in such portion 32, and thus eliminate any tendency of such movement to tear the brace members loose from the supporting member. The position which the parts assume at such time is indicated in dotted lines in Fig. 3.

Where the shock is in the opposite direction from that just above described it will be apparent that the same relative movement of parts occurs, the only difference being that in such case the rear chock blocks 11 exert all the resistance to the momentum of the automobile unless the shock is great enough to bring the upper end of the supports 20 into contact with the ends of the braces 21.

In Fig. 5 is illustrated a modified form of construction which although not as desirable for use as the construction previously described purely from the standpoint of cost, yet will function in the same manner and probably illustrates the principle involved in a clearer manner. In this figure, those parts corresponding to the parts shown in Fig. 3 are similarly enumerated with the exception that the numerals bear a prime. The only difference in this construction and the construction illustrated in Fig. 3 is that the bracket portions 32' are pivotally connected to the bracket portions 30' by means of pivot pins 42, and are pivotally connected to the portions 33' by pivot pins 43. Thus in this construction the upper end of the member 20' is freely movable between the adjacent ends of the brace members 21' and 22', and, as will be apparent, the same movement of parts will occur in this construction as in the construction previously described.

It will be best understood from a study of this construction in Fig. 5 that the tendency to twist the member 20' upon shock will be eliminated, the upper end of the member 20' moving over into contact with the end of one of the brace members and the pivotal movement of the other brace member at its point of attachment with the wall of the freight car due to bending of the corresponding bracket 36, eliminating any tension being set up in such brace member, and consequently, eliminating the tendency of such brace member to twist the supporting member.

While I have shown but one modification of the present invention, and the invention as adapted to a single type of supporting device, it will be apparent to those skilled in the art that the invention herein disclosed may be adapted to the same type of devices in different forms and to different types of devices, and to automobile shipping devices composed either entirely or in part of devices including the present invention, and these and other formal changes may be made in the specific embodiment of the invention described without departing from the spirit or substance of the broad invention, the scope of which is commensurate with the appended claims.

I claim:

1. In combination with a freight car, an upwardly extending supporting element maintained at its lower end against relative movement longitudinally of said freight car, a pair of brace members extending angularly with respect to the side walls of said freight car and secured at one end thereto, the opposite ends of said brace members extending into proximity to said supporting element, and connecting means between said brace members and said supporting element permitting a limited amount of relatively free movement of said supporting element between said brace members.

2. In combination with a freight car, an upwardly extending supporting element maintained at its lower end against relative movement longitudinally of said freight car, a pair of brace members extending angularly with respect to the side walls of said freight car and secured at one end thereto, the opposite ends of said brace members extending into proximity to said supporting element, and means cooperating between said supporting element and said brace members permitting a limited amount of relatively free movement of the upper end of said supporting element longitudinally of said freight car.

3. In combination with a freight car, an upwardly extending supporting element maintained at its lower end against relative movement longitudinally of said freight car, a pair of brace members extending angularly with respect to the side walls of said freight car and secured at one end thereto, the opposite ends of said brace members extending into spaced but adjacent relationship, and means for connecting said supporting element to the adjacent ends of said brace members for relatively free movement therebetween.

4. In combination with a freight car, an upwardly extending supporting element maintained at its lower end against relative movement longitudinally of said freight car, a pair of brace members extending angularly with respect to the side walls of said freight car and secured at one end thereto, the opposite ends of said brace members extending into spaced but adjacent relationship, and means for connecting said supporting element to the adjacent ends of said brace members for relatively unrestricted movement longitudinally of said freight car therebetween.

5. In combination with a freight car, an upwardly extending supporting element maintained at its lower end against relative movement longitudinally of said freight car, a pair of brace members extending angularly with respect to the side walls of said freight car and secured at one end thereto, the opposite ends of said brace members extending into spaced but adjacent relationship, and means for connecting said supporting element to the adjacent ends of said brace members for relatively free movement therebetween comprising a bracket having readily yieldable portions connecting said brace members and said supporting element.

6. In combination with a freight car, an upwardly extending supporting element maintained at its lower end against relative movement longitudinally of said freight car, a pair of brace members extending angularly with respect to the side walls of said freight car and secured at one end thereto, the opposite ends of said brace members extending into spaced but adjacent relationship, and means for connecting said supporting element to the adjacent ends of said brace members for relatively free movement therebetween comprising a sheet metal bracket having readily bendable portions.

7. In combination with a freight car, an upwardly extending supporting element maintained at its lower end against relative movement longitudinally of said freight car, a pair of brace members extending angularly with respect to the side walls of said freight car and secured at one end thereto, the opposite ends of said brace members extending into spaced but adjacent relationship, and means for connecting said supporting element to the adjacent ends of said brace members for relatively free movement therebetween comprising a W-shaped sheet metal bracket member.

8. In combination with a freight car, an upwardly extending supporting element maintained at its lower end against relative movement longitudinally of said freight car, a pair of brace members extending angularly with respect to the side walls of said freight car and secured at one end thereto, the opposite ends of said brace members extending into spaced but adjacent relationship, and means for connecting said supporting element to the adjacent ends of said brace members for relatively free movement therebetween comprising a sheet metal bracket member having a central portion secured to said supporting element, terminal portions connected to said brace members and portions intermediate said central and terminal portions extending at an angle to both of them.

9. In combination with a freight car, a loading deck comprising an upwardly and inwardly extending supporting unit, a pair of brace members one secured to the wall of said freight car forwardly of said supporting unit and one rearwardly thereof and each extending inwardly into cooperative relationship with respect to said supporting unit, and means connecting said brace members and said supporting unit for relatively free movement of the latter relative to said brace members.

10. In combination with a freight car, a loading deck comprising an upwardly and inwardly extending supporting unit, a pair of brace members one secured to the wall of said freight car forwardly of said supporting unit and one rearwardly thereof and each extending inwardly into cooperative relationship with respect to said supporting unit, and means connecting said brace members and said supporting unit for relatively free movement of the latter relative to said brace members within predetermined limits longitudinally of said freight car.

11. In a shipping deck for automobiles, in combination, supporting means, and bracing means for said supporting means connected thereto by a substantially freely yieldable member.

12. In a shipping deck for automobiles, a supporting member and a pair of brace members, one end of all of said members normally lying in spaced but proximate relation with respect to each other, and a bracket element securing said ends together for a limited amount of relatively free movement therebetween.

13. In a shipping deck for automobiles, a supporting member and a pair of brace members, one end of all of said members normally lying in spaced but proximate relation with respect to each other, and a bracket element securing said ends together and including relatively freely bendable portions extending between each of said brace members and said supporting member.

14. In combination with a freight car, means for securing an automobile for shipment therein comprising means for directly supporting one end of said automobile from the floor of said freight car for at least a limited amount of relatively free movement longitudinally thereof, and means for resiliently resisting movement of the other end of said automobile longitudinally of said freight car.

15. In combination with a freight car, an automobile therein, means for directly supporting one end of said automobile from the floor of said freight car for at least a limited amount of free movement longitudinally of said freight car, and means at the opposite end of said automobile for resiliently resisting movement thereof longitudinally of said freight car.

16. In combination with a freight car, an automobile therein, means including a member extending directly between the floor of said freight car and said automobile for supporting one end of said automobile for a limited amount of free movement longitudinally of said freight car, and means at the opposite end of said automobile for resiliently resisting movement thereof longitudinally of said freight car.

17. In combination with a freight car, an automobile therein, means for supporting one end of said automobile at an elevation with respect to the floor of said freight car for at least a limited amount of free movement longitudinally of said freight car, and means at the opposite end of said automobile for resiliently resisting movement thereof longitudinally of said freight car comprising chock blocks engaging the tires at the corresponding end of said automobile.

18. In combination with a freight car, an automobile therein, means for supporting one end of said automobile at an elevation with respect to the floor of said freight car comprising an upwardly extending supporting member and a pair of brace members confining the upper end of said supporting member therebetween for at least a limited amount of relatively free movement longitudinally of said freight car, and means cooperating between the opposite end of said automobile and said freight car for resiliently resisting movement of said automobile longitudinally of said freight car.

19. In combination with a freight car, an automobile therein, means for supporting one end of said automobile at an elevation with respect to the floor of said freight car comprising an upwardly extending supporting member and a pair of brace members confining the upper end of said supporting member therebetween for at least a limited amount of relatively free movement longitudinally of said freight car, and means cooperating between the opposite end of said automobile and said freight car for resiliently resisting movement of said automobile longitudinally of said freight car comprising chock blocks secured against movement to the floor of said freight car in contact with the corresponding tires of said automobile.

20. In combination with a freight car, an automobile therein, means for supporting one end of said automobile at an elevation with respect to the floor of said freight car comprising an upwardly extending supporting member and a pair of hinged brace members confining the upper end of said supporting member therebetween for at least a limited amount of relatively free movement longitudinally of said freight car, and means cooperating between the opposite end of said automobile and said freight car for resiliently resisting movement of said automobile longitudinally of said freight car comprising chock blocks secured against movement to the floor of said freight car in contact with the corresponding tires of said automobile.

CLIFFORD L. SNYDER.